(12) United States Patent
Rustemeyer et al.

(10) Patent No.: US 7,217,452 B2
(45) Date of Patent: May 15, 2007

(54) ELASTOMER-BONDED SHEET MATERIAL AND PROCESS FOR ITS PRODUCTION

(75) Inventors: Ulrich Rustemeyer, Maria Enzersdorf (AT); Joerg Latte, Sengen (CH); Stephan Piringer, Vienna (AT)

(73) Assignee: Klinger AG, Zug (CH)

(*) Notice: Subject to any disclaimer, the term of this patent is extended or adjusted under 35 U.S.C. 154(b) by 15 days.

(21) Appl. No.: 10/862,014

(22) Filed: Jun. 4, 2004

(65) Prior Publication Data

US 2004/0265559 A1 Dec. 30, 2004

(30) Foreign Application Priority Data

Jun. 6, 2003 (DE) ............... 103 25 700

(51) Int. Cl.
*A01K 1/015* (2006.01)
*F16J 15/20* (2006.01)

(52) U.S. Cl. ........................ 428/221; 277/540

(58) Field of Classification Search ............... 524/563, 524/60, 352, 354, 526, 520; 528/503, 480; 428/364, 401, 392, 221; 277/540
See application file for complete search history.

(56) References Cited

U.S. PATENT DOCUMENTS

| | | | | |
|---|---|---|---|---|
| 331,140 A | * | 11/1885 | Blank | 442/65 |
| 3,177,721 A | * | 4/1965 | Vernet | 60/527 |
| 4,575,531 A | * | 3/1986 | Hoyt et al. | 524/563 |
| 5,242,972 A | * | 9/1993 | Negishi et al. | 524/545 |
| 5,459,202 A | * | 10/1995 | Martinez et al. | 525/200 |
| 6,624,251 B1 | * | 9/2003 | Chmielewski | 525/199 |

FOREIGN PATENT DOCUMENTS

| | | |
|---|---|---|
| DE | 3802090 C2 | 5/1990 |
| DE | 4111220 A1 | 10/1991 |
| DE | 69322786 T2 | 6/1999 |
| EP | 0199226 A2 | 4/1986 |
| EP | 0324278 A2 | 7/1989 |
| EP | 0407097 A2 | 1/1991 |
| EP | 0739941 A1 | 10/1996 |
| FR | 2296661 A | 9/1976 |
| FR | 2691973 A1 | 12/1993 |
| JP | 56136841 A | 10/1981 |

OTHER PUBLICATIONS

Elvers, B.; Ulmann's encyclopedia of industrial chemistry; 1993, vol. A23, pp. 382-383.

* cited by examiner

*Primary Examiner*—N Edwards
(74) *Attorney, Agent, or Firm*—Townsend and Townsend and Crew LLP.; Henry Heines

(57) ABSTRACT

The invention relates to an elastomer-bonded sheet material encompassing vulcanized elastomer content and content composed of at least one filler bonded therein, where the vulcanized elastomer content encompasses, based on the entire elastomer content, from about 25 to 70% by weight, preferably from about 40 to 60% by weight, of at least one vulcanized elastomer which in the unvulcanized state has not more than 10%, preferably not more than 7%, of unsaturated carbon double bonds in the main chain.

16 Claims, 1 Drawing Sheet

ELASTOMER-BONDED SHEET MATERIAL AND PROCESS FOR ITS PRODUCTION

FIELD OF THE INVENTION

The invention relates to an elastomer-bonded sheet material as it is especially useful for sealing purposes. The invention further relates to a process for producing such an elastomer-bonded sheet material.

BACKGROUND OF THE INVENTION

It is known that fibre-reinforced elastomer gaskets are susceptible to irreversible aging. Previously, this was concealed by way of a very high asbestos content of up to 80% by weight, so that the material retained its stability despite aged elastomer. Once the health risk caused by asbestos had been recognized, attempts were made to replace it with other fibres, in particular synthetic fibres, such as p-aramid fibres, glass fibres or carbon fibres. However, the high costs for these fibres and, respectively, production problems with the use of certain fibres meant that their content had to be markedly reduced and substituted by low-cost pulverulent fillers, such as kaolins, silicon dioxide, graphite, etc.

The result of this is that the elastomeric binder then has to take on an increased proportion of the stabilization of the gasket material, although the elastomer firstly has the lowest thermal stability of the raw materials used and secondly is susceptible to aging, which impairs the long-term integrity of the fibrous and pulverulent fillers.

Depending on the R rubber type usually used as elastomer material (diene elastomers, such as NBR, SBR, NR, etc.) and the amount of the terpolymers (such as acrylonitrile or styrene) copolymerized therein, the rubber types mainly used for gasket material contain up to 35% of unsaturated carbon double bonds, which make them susceptible to oxidation, because these double bonds can react directly with oxygen to give hydroperoxides. Subsequent abstraction of the H atom on the resultant hydroperoxide leads to formation of polymer free radicals and thus to breakage of the macromolecule. The measurable effects of this mostly aerobic thermal aging include a significant increase in the modulus of elasticity and the associated reduction in flexibility, i.e. an increase in brittleness. The latter can then cause microcracking, the results of which can extend to total blow-out of the gasket, even in the case of minimal load changes at a gasketed flange, for example initiated by the dilatation of pipeline systems during the start-up and shut-down of installations.

A further problem here is also caused by the post-vulcanization of unsaturated carbon double bonds in the main chain of the elastomer material. As long as uncrosslinked dienes remain in the main chain in the presence of crosslinking reagents which have not yet been consumed (such as sulphur, sulphur donors or peroxidically generated free radicals), the elastomer material remains susceptible to post-crosslinking long after its process-vulcanization. In the case of gaskets, this likewise leads to hardening of the material, with the effects listed above.

SUMMARY OF THE INVENTION

It is an object of the invention to provide an elastomer-bonded sheet material having an improved long-term performance although the content of fibrous fillers is relatively small. It is a further object of the invention to provide an elastomer-bonded sheet material showing a reduction in aging phenomena.

It is an additional object of the invention to provide a process for the production of an elastomer-bonded sheet material having an improved long-term performance although the content of fibrous fillers is relatively small. It is still a further object of the invention to provide a process for the production of elastomer-bonded sheet material having an improved long-term performance although the content of fibrous fillers is relatively small.

The invention concerns an elastomer-bonded sheet material encompassing vulcanized elastomer content and content composed of at least one filler bonded therein, wherein the vulcanized elastomer content encompasses, based on the entire elastomer content, from about 25 to 70% by weight, preferably from about 40 to 60% by weight, of at least one vulcanized elastomer which in the unvulcanized state has not more than 10%, preferably not more than 7%, of unsaturated carbon double bonds in the main chain.

The invention further concerns an elastomer-bonded sheet material encompassing vulcanized elastomer content and content of at least one filler bonded therein, wherein there are at least two layers applied with vulcanization and firmly bonded thereby and composed of vulcanized elastomer with at least one filler bonded therein, where in the case of at least one, and fewer than the total number of the layers, the at least one filler has been bonded by way of at least one elastomer which in the unvulcanized state has not more than 10%, preferably not more than 7%, of unsaturated carbon double bonds in the main chain.

The long-term performance of such a material is considerably improved, and the degradation of the macromolecules is made to proceed more slowly, in an elastomer-bonded sheet material composed of vulcanized elastomer with at least one filler bonded therein if the vulcanized elastomer material encompasses, based on the entire elastomer content, from about 25 to 70% by weight, preferably from about 40 to 60% by weight, of at least one vulcanized elastomer which in the unvulcanized state has not more than 10%, preferably not more than 7%, of unsaturated carbon double bonds in the main chain.

Oxidation sensitivity is considerably further reduced and the slowing of the degradation of the macromolecules is moreover increased in an elastomer-bonded sheet material composed of at least two mutually bonded layers, bonded by way of vulcanized elastomer material and comprising at least one filler, and applied with vulcanization and firmly bonded thereby, if at least one layer has been bonded by means of a vulcanized elastomer which, in the unvulcanized state, has not more than 10%, preferably not more than 7%, of unsaturated carbon double bonds in the main chain, in particular by means of a partially hydrogenated R rubber or M rubber having at least substantially saturated main chains of polymethylene type. It is significant here that the sheet material does not have a homogeneous structure, produced by using an elastomer mixture, for example composed of M rubbers and of R rubbers, but rather—as stated—is composed of at least two heterogeneous layers, of which, however, at least one has been bonded exclusively by way of the elastomer mentioned having ≦10% of unsaturated carbon double bonds in the main chain. Other layers may be bonded either exclusively by way of an R rubber or by way of any desired combination of R rubbers, including partially hydrogenated R rubbers, and/or of M rubbers. The respective layers "with and without carbon double bonds" advantageously alternate.

The need for these heterogeneous layers is a result, inter alia, of the competing reactions which occur during crosslinking in the simultaneous presence of two or more elastomers. For example, various dienes are crosslinked earlier or more quickly as a result of their differing partial charges, steric geometries or conjugated double bonds, these therefore usurping all of the bridge-forming reagents. The result of this would be that little or no crosslinking would occur of the less reactive elastomers present in the mixture, because of the shortage of crosslinking reagents. If this were the case, there would be an elastomer present in uncrosslinked or inadequately crosslinked form in the sheet material, and that elastomer would be unable to serve its function as a stabilizing matrix which binds the fibrous and pulverulent fillers.

The separate build-up of heterogeneous layers also permits the use of different crosslinking systems within one sheet material. In this way, an ideally formulated vulcanization system, for example with respect to pH, accelerator, activators, can be used for each elastomer or each elastomer mixture, thus giving ideal crosslinking.

The invention further concerns a process for producing an elastomer-bonded sheet material composed of at least two layers, where, for each layer, a starting mixture is prepared in the presence of a solvent by mixing and encompasses elastomer content, crosslinking reagents, processing aids and fillers, and the starting mixtures are processed successively in layers to give the sheet material, the layers having been applied with vulcanization and thereby having been firmly bonded, where in order to prepare the starting mixture for at least one layer use is made exclusively of elastomer content composed of at least one vulcanized elastomer which has, in its main chain, in the unvulcanized state, not more than 10%, preferably not more than 7%, of unsaturated carbon double bonds.

Further embodiments of the invention are found in the description below and in the claims.

BRIEF DESCRIPTION OF THE DRAWINGS

The invention will be further illustrated in detail below, using examples and process descriptions.

DETAILED DESCRIPTION OF PREFERRED EMBODIMENTS

Figure 1:
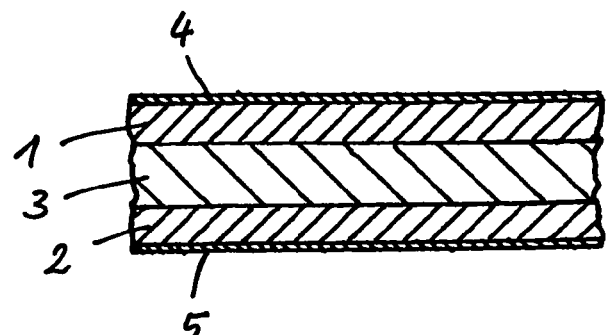
FIG. 1 shows a section of one preferred embodiment of one elastomer-bonded sheet material for gaskets.

The embodiment of a sheet material suitable for producing flat gaskets and shown in section in FIG. 1 encompasses two layers 1, 2, the fillers of which have been bonded by means of nitrile-butadiene rubber, partially hydrogenated, with <7% content of double bonds. Between these two layers 1, 2, there is a layer 3, the fillers of which have been bonded by means of at least one R rubber. The layers 1–3 have been applied with vulcanization and thereby firmly bonded to one another. The layers 1–3 may have thicknesses of about 100 µm and 4 mm. In addition, there may be thin external coatings 4, 5 for particular application conditions, for example in the form of adhesive layers or release layers. Some, or all, of the layers 1–3 may also have reinforcement in the form of a textile, in particular a wire gauze, or reinforcement components of expanded metal.

Figure 2:
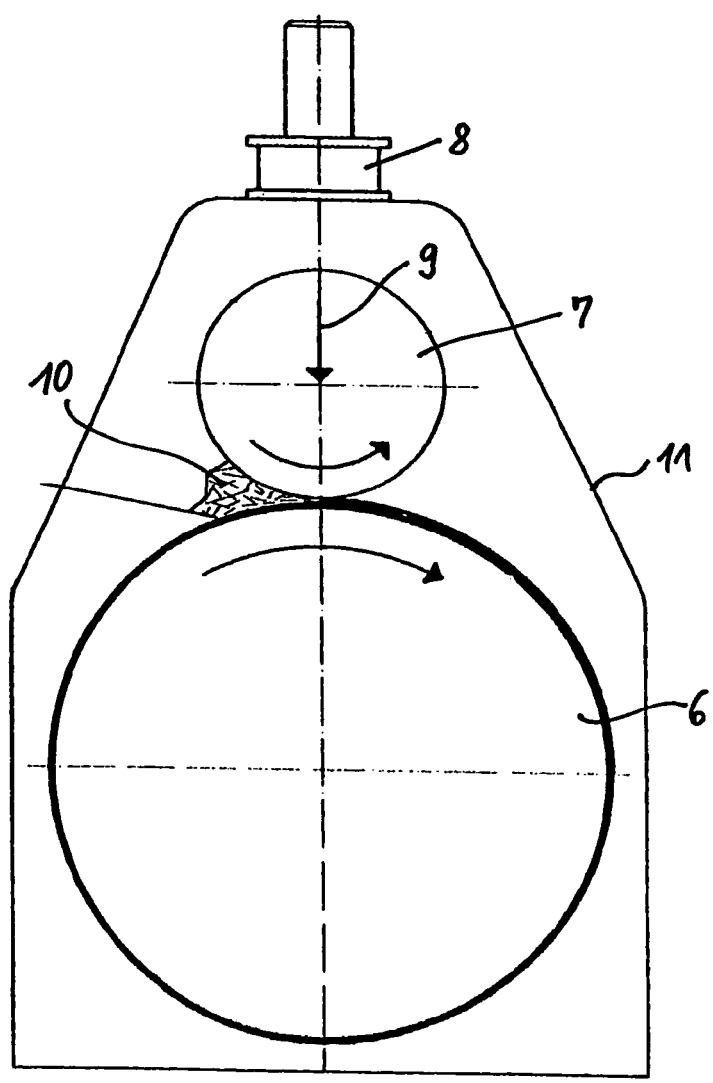
FIG. 2 shows a two-roll calender for producing elastomer-bonded sheet material.

A two-roll calender shown in way of example in FIG. 2 has one large, heated roll 6 (from 1 to 6 m circumference) (typically at from 140 to 190° C.), and, there above, a smaller-circumference cooling roll 7 (typically at from 10 to 30° C.), and these counter-rotate. The cooling roll 7 is pressed in the direction towards the heated roll 6 by means of a hydraulic cylinder 8 as shown by the arrow 9. A pasty or crumbly material 10 is introduced into the nip in order to produce a layer of the sheet material. The two-roll calender has been accommodated within an appropriate housing 11 in order to capture vapourizing solvent.

To produce the sheet material, the individual raw materials, such as elastomer material, vulcanization additives, pulverulent fillers, fibre material and processing aids, are mixed together with a mostly organic solvent, such as petroleum spirit, toluene or xylene, in a high-speed mixer to give a homogeneous material. If use is made of more than one elastomer, the blending thereof is carried out simultaneously in the high-speed mixer. The sequence of the addition of the raw materials depends on the constitution of the material. The mixer may have agitator paddles or agitator blades and, where appropriate, one or more high-speed knife heads. The mixing process gives a pasty or crumbly material. This is then further processed on a two-roll calender according to FIG. 2 to give sheet material, by introducing the pasty or crumbly material into the nip and using the counter-rotating movement of the rotating rolls 6, 7, typically rotating at the same peripheral velocity, to draw the composition into the system. The result is that the sheet material forms in thin layers (from about 0.008 to 0.02 mm), with vapourization of the solvent and incipient crosslinking of the rubber on the surface of the heated roll 6. These layers are continuously supplemented by a further layer with each further rotation of the roll 6. Immediately after application to the roll, each layer is dried and vulcanized during the rotation of the roll 6, and compacted by way of the pressure applied between the rolls 6, 7. Once the desired final thickness of each layer to be produced have been achieved, and all of the layers of the sheet material have been completed, the rolls 6, 7 are parted and stopped, and the sheet material surrounding the roll 6 is cut up and peeled from the roll 6. Useful flat gaskets can be produced from the resultant sheet material, by way of example typically stamped out or cut, laser-cut, cut by a high-pressure water jet, or sawn.

EXAMPLE 1

Composition 1 With Exclusively an R Rubber as Matrix

The following raw materials were mixed to give a homogeneous mass of crumb in a turbular mixer.
- 13–17 parts of R rubber; in this case nitrile-butadiene rubber
- 38–45 parts of kaolin
- 3–8 parts of precipitated silica
- 5–9 parts of para-aramid fibre
- 25–30 parts of glass fibre
- 2–3 parts of sulphur-based vulcanization additives, composed of sulphur, activator, accelerator, co-activators and processing aids The NBR was dissolved during the mixing process, using 28–33 parts (based on the total amount of dry substance) of toluene.

EXAMPLE 2

Composition 2 With a Blend Composed of R and M Rubber or Partially Hydrogenated R Rubbers as Matrix The following raw materials were mixed to give a homogeneous mass of crumb in a turbular mixer.
- 6.5–8.5 parts of R rubber; nitrile-butadiene rubber
- 6.5–8.5 parts of M rubber or rubber with <7% content of double bonds, in this case partially hydrogenated nitrile-butadiene rubber (34±1% ACN, 3–5% of residual double bonds)
- 38–45 parts of kaolin
- 3–8 parts of precipitated silica 5–9 parts of para-aramid fibre 25–30 parts of glass fibre 2–3 parts of sulphur-based vulcanization additives, composed of sulphur, sulphur donor, activator, accelerator, co-activators and processing aids Both elastomers were dissolved during the mixing process, using 28–33 parts (based on the total amount of dry substance) of toluene.

EXAMPLE 3

Composition 3 with Exclusively an M Rubber or a Partially Hydrogenated R Rubber as Matrix The following raw materials were mixed to give a homogeneous mass of crumb in a turbular mixer.

13–17 parts of M rubber; or rubber with <7% content of double bonds, in this case partially hydrogenated nitrile-butadiene rubber (34±1% ACN, 3.5% of residual double bonds)

38–45 parts of kaolin

3–8 parts of precipitated silica

5–9 parts of para-aramid fibre

25–30 parts of glass fibre

2–3 parts of sulphur-based vulcanization additives, composed of sulphur, sulphur donor, activator, accelerator, co-activators and processing aids The HNBR was dissolved during the mixing process, using 28–33 parts (based on the total amount of dry substance) of toluene.

Example of Production of Sample Sheets

A two-roll vertical calender according to FIG. 2 was used to produce sample sheets.

The roll 6 heated with high-pressure water was heated to 180±5° C. surface temperature. The circumference of the roll 6 was 4060 mm and its width was 1560 mm. The cooling roll 7 was cooled by means of cooling water to a surface temperature of 20±5° C. The circumference of the cooling roll 7 was 1585 mm and its width was 1560 mm. The cooling roll 7 was applied with a force of 90±1 kN onto the roll 6. The two rolls 6, 7 move simultaneously in opposite senses with a peripheral velocity (depending, inter alia, on the sheet thickness) of from 30 to 90 m/min. While the two rolls 6, 7 were rotating, the prepared compositions 10 were introduced in portions into the nip. The starting weight of all of the compositions 10 was selected in such a way as to permit a gasket sheet of thickness 2 mm to be drawn off after the calendering process had ended.

In each case, 30 kg total weight of the preferred compositions 1 to 3 were processed by rolling to give gasket sheets of thickness 2 mm, as in the table below:

| Sample No.: | Number and thickness of layers | Relative binder content | |
|---|---|---|---|
| 1 | 1 (2 mm) | 100% NBR composition according to Example 1 | |
| 2 | 1 (2 mm) | 100% HNBR composition according to Example 3 | |
| 3 | 1 (2 mm) | 50% HNBR/50% NBR composition according to Example 2 | |
| 4 | 3<br>0.5 mm | Relative content<br>1st layer: 100% HNBR | Absolute content<br>25% HNBR composition according to Example 3 |
| | 1.0 mm | 2nd layer: 100% NBR | 50% NBR composition according to Example 2 |
| | 0.5 mm | 3rd layer: 100% HNBR | 25% HNBR composition according to Example 3 |
| | | Total absolute content: 50% HNBR/50% NBR | |

In contrast to the sample sheets 1–3, the sample 4 was produced using both composition 1 and composition 3 to give a sheet composed of 3 layers. The procedure here was as follows. Firstly, 7.5 kg of the composition 3 were processed by rolling, compacted and vulcanized under process conditions identical with those for samples 1–3. Without stopping the rolls, i.e. directly thereafter, 15 kg of the composition 1 were compacted and vulcanized onto the first layer of the composition 3. Again, directly thereafter, with no intermediate stopping of the rolls, a further 7.5 kg of the composition 3 were applied by rolling, compacted and vulcanized. The sample sheet 4 is therefore composed of three mutually adhering layers (as illustrated in FIG. 1), the upper and lower layer having been bonded exclusively with HNBR, and the middle layer using NBR as matrix.

An important and decisive fact here is that sample sheet 3 and sample sheet 4 are constituted entirely from the same amount of the same raw materials (except vulcanization reagents), separate processing of the elastomers meaning, however, that they are present in heterogeneous layers. Depending on the elastomer used, it is also possible for the crosslinking additives in the various layers to differ, in order to achieve ideal vulcanization characteristics for each rubber.

In order firstly to quantify the effects of the elastomers used and secondly to quantify the effect of the structure in which the elastomers are present, on the aging performance of the gaskets, high-temperature wet steam tests were carried out on the sample sheets. This test has excellent suitability for testing the degradation performance of elastomer-bonded flat gaskets under extremely critical conditions, thus permitting differentiation between different gasket materials, because the high temperatures of 320° C. and the wet steam environment with a pressure of 120 bar place enormous stress, both thermal and oxidative, on the elastomers during this test.

Gasket rings of dimensions $D_a$=98 mm, $D_i$=58 mm, d=2 mm were stamped from the sample sheets 1—4. These specimens were clamped into the test rig using a pressure of 44 N/mm² in a closed blind flange. In this closed blind flange there were 10 g of demineralized water. The blind flange was brought to a temperature of 320° C. Some of the water situated therein evaporated and formed a wet steam environment within the blind flange. Because the blind flange had been closed, it was subjected to the internal pressure of 120 bar required by the vapour-pressure curve. A data ladder was used to record this internal pressure as a function of time.

A sudden pressure fall-off within the blind flange, caused by steam escape along cracks or disrupted joints in the specimen, indicates failure of the gasket due to degradation of the elastomer.

The time expired for sudden pressure fall-off in this system can be taken as a measurement of the aging resistance of the gasket and, respectively, of the elastomer used.

The results for sample sheets 1–4 are, respectively, 4, 17, 15 and 30 days of operating time, and therefore corresponding slowing of the aging process. The replacement of half of the NBR by HNBR in itself leads to a substantial operating time prolongation, but this is only half as long as for sample sheet 4, which is composed of heterogeneous layers and has greatly increased resistance to heat and oxidation, although the raw materials and process parameters are identical. Preference is therefore given to a sheet material composed of layers of this type.

The fillers are present in a proportion of at least 30% by weight of the respective layer material. One or more of the following fibers may optionally be incorparated as fibrous fillers; para-aramid fibers, carbon fibers, ceramic fibers, cellulose fibers or fibers composed of cellulose derivatives, cotton fibers, fibrous wollastonites, glass fibers, mineral wool fibers, or polymer fibers, etc.

One or more of the following materials may optionally also be incorporated as pulverulent fillers: calcined or uncalcined kaolin, heavy spar, wollastonites, powdered mica, powdered slate or shale, powdered quartz, carbon black, graphite, powdered glass, calcium carbonate, cork, various silicas, silicon carbide, silicon nitride, titanium oxide, boron nitride or the like.

Fillers may, where possible and advantageous, have been surface-treated to establish certain properties, e.g. using silanes, titanates, stannates, etc.

One or more of the following groups of crosslinking chemicals may also optionally be used as crosslinking systems: sulphur-accelerator systems, sulphur-donor systems, peroxides, high-energy radiation or diamines or phosphate crosslinking systems or thiophosphate crosslinking systems.

One or more of the following substances may also optionally be used as processing aids or additives: release agents, masticating agents, stabilizers, antioxidants, adhesion promoters, organic and inorganic colorants, blowing agents, plasticizers or vulcanization retarders.

The matrix material to be used for the R rubbers is preferably one or more of the following elastomers: NR, NBR, SBR, BR, IR or CR (abbreviations in accordance with ISO 1629).

At least one of the following elastomers may be used as matrix material for the M rubbers or for the rubbers with <10% content of unsaturated double bonds preferably in the main chain and in particular <7%: EPDM, EPM, HNBR, ACM, AECM, FKM or EAM. Partially hydrogenated rubbers, such as HSBR, HNR, HCR, etc., may likewise be used as matrix material.

The following polar or non-polar substances may be used as solvents, as appropriate to the elastomer: petroleum spirit, benzene, toluene, xylene, ethanol, THF, water, esters, ketones or dichloromethane.

The sheet material may also be produced via independent production of layers 1–3 followed by bonding of the layers via vulcanization or via successive production of the layers 1–3 in a form which has, for example, been adapted to the intended use.

While the invention has been shown and described with reference to preferred embodiments, it should be apparent to one of ordinary skill in the art that many changes and modifications may be made without departing from the spirit and scope of the invention as defined in the claims.

What is claimed is:

1. An elastomer-bonded sealing sheet material, comprising:
   a first layer of a thickness of about 100 μm to about 4 mm, said first layer comprising a vulcanized elastomer and a fiber-containing filler bonded to said elastomer, said filler constituting at least 30 weight % of said first layer,
   a second layer of a thickness of about 100 μm to about 4 mm, said second layer comprising an R-rubber vulcanized elastomer and a fiber-containing filler bonded to said elastomer, said filler constituting at least 30 weight % of said second layer,
   said vulcanized elastomer of said first layer having been formed from a non-vulcanized elastomer having a backbone with not more than 10% unsaturated double bonds, and
   said first and second layers being firmly bonded to each other by vulcanization.

2. The elastomer-bonded sealing sheet material of claim 1 comprising three or more layers bonded to each other by vulcanization, said three or more layers consisting of one or more of said first layer and one or more of said second layer in alternation with said one or more of said first layer.

3. The elastomer-bonded sealing sheet material of claim 1 wherein said vulcanized elastomer of said first layer is formed from a non-vulcanized elastomer having a backbone with not more than 7% unsaturated double bonds.

4. The elastomer-bonded sealing sheet material of claim 1 wherein said vulcanized elastomer of said first layer comprises a member selected from the group consisting of M-rubbers and partially hydrated R-rubbers.

5. The elastomer-bonded sealing sheet material of claim 1 wherein said fiber-containing fillers of said first and second layers are members selected from the group consisting of p-aramid fibers, glass fibers, mineral wool fibers, carbon fibers, ceramic fibers, cellulose fibers, cellulose derivative fibers, cotton fibers, fibrous wollastonites, polymer fibers, calcined kaolins, uncalcined kaolins, heavy spar, pulverulent wollastonites, mica, slate, shale, quartz, carbon black, graphite, powdered glass, calcium carbonate, cork, silicon dioxide, silicon carbide, and silicon nitride.

6. The elastomer-bonded sealing sheet material of claim 1 wherein said R-rubber-containing vulcanized elastomer of said second layer is at least one member selected from the group consisting of NR, NBR, SBR, IR, and CR.

7. The elastomer-bonded sealing sheet material of claim 1 wherein said R-rubber vulcanized elastomer of said second layer is blended with a member selected from the group consisting of M-rubbers and partially hydrated R-rubbers.

8. The elastomer-bonded sealing sheet material of claim 1 wherein said vulcanized elastomer of said first layer is at least one member selected from the group consisting of EPDM, EPM, HNBR, ACM, AECM, FKM, CSM, and EAM.

9. A gasket comprising:
   a first layer of a thickness of about 100 μm to about 4 mm, said first layer comprising a vulcanized elastomer and a fiber-containing filler bonded to said elastomer, said filler constituting at least 30 weight % of said first layer,
   a second layer of a thickness of about 100 μm to about 4 ram, said second layer comprising an R-rubber vulcanized elastomer and a fiber-containing filler bonded to said elastomer, said filler constituting at least 30 weight % of said second layer, said vulcanized elastomer of said first layer having been formed from a non-vulcanized elastomer having a backbone with not more than 10% unsaturated double bonds, and said first and second layers being firmly bonded to each other by vulcanization.

10. The gasket of claim 9 comprising three or more layers bonded to each other by vulcanization, said three or more layers consisting of one or more of said first layer and one or more of said second layer in alternation with said one or more of said first layer.

11. The gasket of claim 9 wherein said vulcanized elastomer of said first layer is formed from a non-vulcanized elastomer having a backbone with not more than 7% unsaturated double bonds.

12. The gasket of claim 9 wherein said vulcanized elastomer of said first layer comprises a member selected from the group consisting of M-rubbers and partially hydrated R-rubbers.

13. The gasket of claim 9 wherein said fiber-containing fillers of said first and second layers are members selected from the group consisting of p-aramid fibers, glass fibers, mineral wool fibers, carbon fibers, ceramic fibers, cellulose fibers, cellulose derivative fibers, cotton fibers, fibrous wollastonites, polymer fibers, calcined kaolins, uncalcined kaolins, heavy spar, pulverulent wollastonites, mica, slate, shale, quartz, carbon black, graphite, powdered glass, calcium carbonate, cork, silicon dioxide, silicon carbide, and silicon nitride.

14. The gasket of claim 9 wherein said R-rubber vulcanized elastomer of said second layer is at least one member selected from the group consisting of NR, NBR, SBR, IR, and CR.

15. The gasket of claim 9 wherein said R-rubber vulcanized elastomer of said second layer is a blend of an R-rubber with a member selected from the group consisting of M-rubbers and partially hydrated R-rubbers.

16. The gasket of claim 9 wherein said vulcanized elastomer of said first layer is at least one member selected from the group consisting of EPDM, EPM, HNBR, ACM, AECM, FKM, CSM, and EAM.

* * * * *